C. H. RIGGS.
Planer Chuck.
No. 78,132. Patented May 19, 1868.
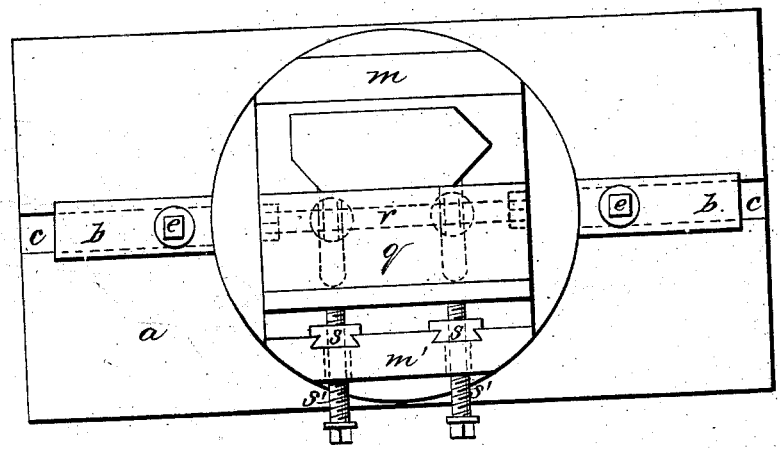
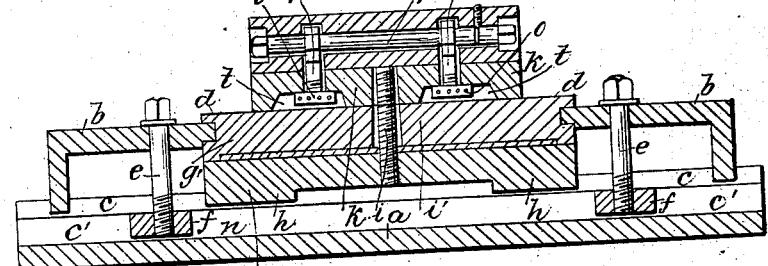
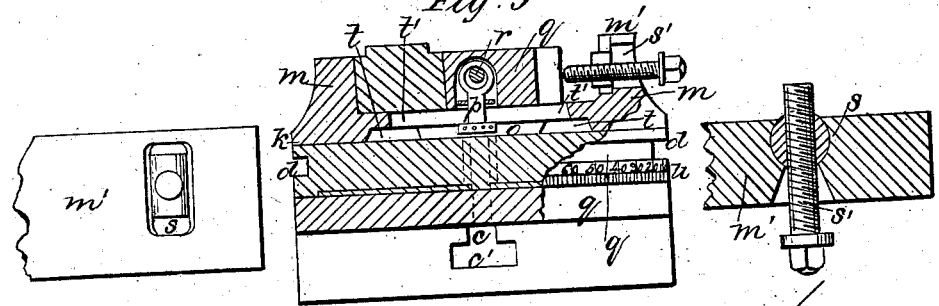
Witnesses:
J. W. Matherson
E. W. Pless
Inventor:
Chas H. Riggs

United States Patent Office.

CHARLES H. RIGGS, OF WINDSOR LOCKS, CONNECTICUT.

Letters Patent No. 78,132, dated May 19, 1868.

IMPROVEMENT IN PLANER-CHUCKS.

*The Schedule referred to in these Letters Patent and making part of the same.*

TO ALL WHOM IT MAY CONCERN:

Be it known that I, CHARLES H. RIGGS, of Windsor Locks, county of Hartford, and State of Connecticut, have invented certain new and useful Improvements in Chucks for Milling or Planing-Machines; and to enable others skilled in the art to make and use the same, I will proceed to describe its construction and operation, by referring to the drawings, in which the same letters indicate like parts in each of the figures.

The nature of this invention will be understood from the specification and drawings.

The object of this invention is to so arrange the chuck upon the plate or bed of the machine, that the work can be quickly arranged and perfectly secured in said chuck, and when so secured the chuck can be quickly and easily rotated, so as to bring the work at any desirable angle to the action of the tool, by means of a scale marked on the edge of the chuck. In the accompanying drawings—

Figure 1 is a top or plan view.
Figure 2 is a side sectional view.
Figure 3 is a sectional end view.
Figure 4 is a modification of the adjustable nuts and tightening-screws.

$a$ is a plate or bed of the machine; $b$ is an angular piece of metal or dog, the lower end of which bears upon the plate $a$, and has a tenon fitted to the groove $c$, to guide it in one direction; the other end takes its bearing in a groove, $d$, formed in the edge of the chuck $g'$. $e$ is a fastening-screw, which passes through the angular plate $b$ into the nut $f$, which works in the groove $c'$. Thus by tightening or loosening the screws $e$, the chuck can be moved back and forth on the plate $a$, and by turning up the shaft $r$, it will be held firmly in a desired position. $g$ is the lower or first member of the chuck, having tenons or guide-bars $h$, to hold the lower member $g$ in a true position upon the plate $a$. $g'$ is the upper or second member of the chuck, the under side of which is depressed, or has a rim formed on its edge, while the outer edge of the lower member is depressed, so as to fit closely into the upper one. This lower plate $g$ is also provided with a stud-pin, $i$, the screw of which is fitted closely into the plate $g$. To this screw-pin $i$ is fitted closely a conical-shaped sleeve, $i'$, so that by turning the screw, the sleeve can be raised more or less, to compensate for the wear or looseness of the central orifice in the plate $g'$ to which it is fitted. $k$ is the clamp or chuck proper, in which the article to be wrought upon is secured. This clamp is firmly secured upon the plate $g'$, and is provided with fixed jaws $m$ $m'$. The under side of this clamp-plate is provided with depressions or openings $t$, for the nuts $o$ to work in, and with slits for the clamping-bolts $p$ to play in. $q$ is an adjustable jaw, having a shaft, $r$, provided with eccentric-bearings. The orifice or eye in the upper end of the bolts $p$ is placed upon said bearings, so that when the nuts $o$ are properly adjusted, simply by turning either end of the shaft $r$, the jaw $q$ will be firmly compressed upon the face of the clamp-plate. $s'$ are adjustable nuts, fitted into one or both of the jaws $m$ $m'$, in a dove-tail form, so that the nut with the screw may be raised or depressed at pleasure, so as to bring the centre of the screw to bear directly against any particular point on the edge of the work being held thereby. Vertical grooves are also provided to allow the screws $s'$ to move with their nuts.

In fig. 4 the adjustable nuts are shown as being made round, and fitted into sockets formed in the jaws $m$, so that the screws may have both a vertical and a vibratory motion, so as to bring the screws into a line at right angles with surface which it bears.

Thus it will be clearly seen that when any piece of work is once secured in this chuck, it may be quickly turned from one position to another, and secured at any desired angle, by means of the index $u$, executed upon the edges of the plates $g$ $g'$.

Having now described my invention, what I claim as new, and desire to secure by Letters Patent, is—

1. In a milling or planing-chuck, the combination of the bed-plate $a$ and angle-iron $b$, chuck $g$ $g'$, screw-bolts $e$, and nuts $f$, substantially as and for the purpose described.

2. The combination of the round or dove-tail adjustable nuts $s$, screws $s'$, with the jaws $m$, with the index $u$, substantially as shown and set forth.

CHAS. H. RIGGS.

Witnesses:
   J. W. MATHEWSON,
   E. W. BLISS.